United States Patent
Lan

(10) Patent No.: US 6,762,861 B2
(45) Date of Patent: Jul. 13, 2004

(54) SCANNER WITH A MOVABLE MIRROR SET IN THE SCANNING MODULE FOR INCREASING THE RESOLUTION OF SCANNED IMAGES

(75) Inventor: Chia-Tsui Lan, Tao-Yuan Hsien (TW)

(73) Assignee: Primax Electronics Ltd., Taipei (TW)

( * ) Notice: Subject to any disclaimer, the term of this patent is extended or adjusted under 35 U.S.C. 154(b) by 274 days.

(21) Appl. No.: 09/682,821

(22) Filed: Oct. 23, 2001

(65) Prior Publication Data

US 2003/0076543 A1 Apr. 24, 2003

(51) Int. Cl.[7] .................................................. H04N 1/04
(52) U.S. Cl. ...................................... 358/475; 358/497
(58) Field of Search ................................. 358/475, 497, 358/494, 474, 471, 496, 483, 482, 505, 509, 506, 487, 484, 512–514; 250/208.1, 234–236; 382/312, 318, 319; 359/210, 212

(56) References Cited

U.S. PATENT DOCUMENTS

| | | | | | |
|---|---|---|---|---|---|
| 5,117,256 | A | * | 5/1992 | Haibara | 355/77 |
| 5,691,824 | A | * | 11/1997 | Haded et al. | 358/497 |
| 5,845,019 | A | * | 12/1998 | Yoshizawa et al. | 382/312 |
| 5,883,727 | A | * | 3/1999 | Tsai | 358/475 |
| 5,907,411 | A | * | 5/1999 | Han | 358/487 |
| 6,124,952 | A | * | 9/2000 | Shieh et al. | 358/475 |
| 6,603,514 | B1 | * | 8/2003 | Tsai et al. | 358/482 |

* cited by examiner

*Primary Examiner*—Cheukfan Lee
(74) *Attorney, Agent, or Firm*—Winston Hsu

(57) ABSTRACT

A scanner with a movable mirror set in the scanning module for increasing the resolution of scanned images. The scanner includes a housing that makes use of a set of movable mirrors. When the mirrors move, the distance traveled by the light from the document to the CCD changes, resulting in a different optical resolution. The lens moves in order to maintain the proper focal distance between the document and the CCD. A driving device coordinates the movement of the lens and the moveable mirrors.

4 Claims, 3 Drawing Sheets

# SCANNER WITH A MOVABLE MIRROR SET IN THE SCANNING MODULE FOR INCREASING THE RESOLUTION OF SCANNED IMAGES

BACKGROUND OF INVENTION

1. Field of the Invention

The present invention relates to a scanner, and more particularly, to a scanner that has a movable mirror set inside its scanning module for increasing the resolution of scanned images.

2. Description of the Prior Art

FIG. 1 is a perspective view of a prior art scanner 10. The scanner 10 comprises a housing 12, a transparent platform 14 onto which a document 18 is placed, and a scanning module 16 for scanning the document 18. The operator of the scanner 10 lays the document 18 face down on the transparent platform 14. The scanning module 16 moves along a track inside the housing 12 and reads the document 18 through the transparent platform 14.

FIG. 2 is a cross-sectional view of the scanning module 16 cut along line 2—2. The scanning module 16 comprises a light source 22, a fixed mirror set 23, a lens 26, and a charge coupled device (CCD) 28. As the scanning module 16 moves across the document 18, the light source 22 illuminates the document 18. The image of the illuminated document 18 is reflected by the mirror set 23. The lens 26 then focuses the image of the document 18 onto the CCD 28.

The resolution of the scanned image is determined by how many photosensitive cells are built into the CCD 28. Resolution is measured in dpi (dots per inch) and for a scanner 10 to scan at 600 dpi, 600 photosensitive cells must be built into each inch-long strip of the CCD 28. To increase the resolution to 1200 dpi, twice as many photosensitive cells must be used when manufacturing the CCD 28. As the desired resolution increases, the cost of manufacturing the CCD 28 increases. It is therefore an important objective to increase the resolution of the scanned image and still keep manufacturing costs low.

SUMMARY OF INVENTION

It is the primary objective of the claimed invention to provide a scanner in which a method may be employed to increase the resolution of a scanned image without increasing the number of photosensitive cells.

According to the claimed invention, the scanner comprises a housing, a transparent platform installed on the housing for placing a document, and a scanning module installed inside the housing for scanning the document. The scanning module comprises a first mirror set fixed inside the scanning module for reflecting light transmitted from the document, a second mirror set moveably installed inside the scanning module for changing an optical path of the light transmitted from the document so as to change resolution of a scanned image, and a lens set moveably installed inside the scanning module for focusing the light transmitted from the first and second mirror sets. When the second mirror set is moved to change the resolution of the scanned image, the lens set will move correspondingly to adjust the focus of the light transmitted from the first and second mirror sets.

It is an advantage of the claimed invention that the resolution of the scanned image can be increased without increasing the number of photosensitive cells built into the CCD.

These and other objects and the advantages of the present invention will no doubt become obvious to those of ordinary skill in the art after having read the following detailed description of the preferred embodiment that is illustrated in the various figures and drawings.

DETAILED DESCRIPTION

Figure 1:
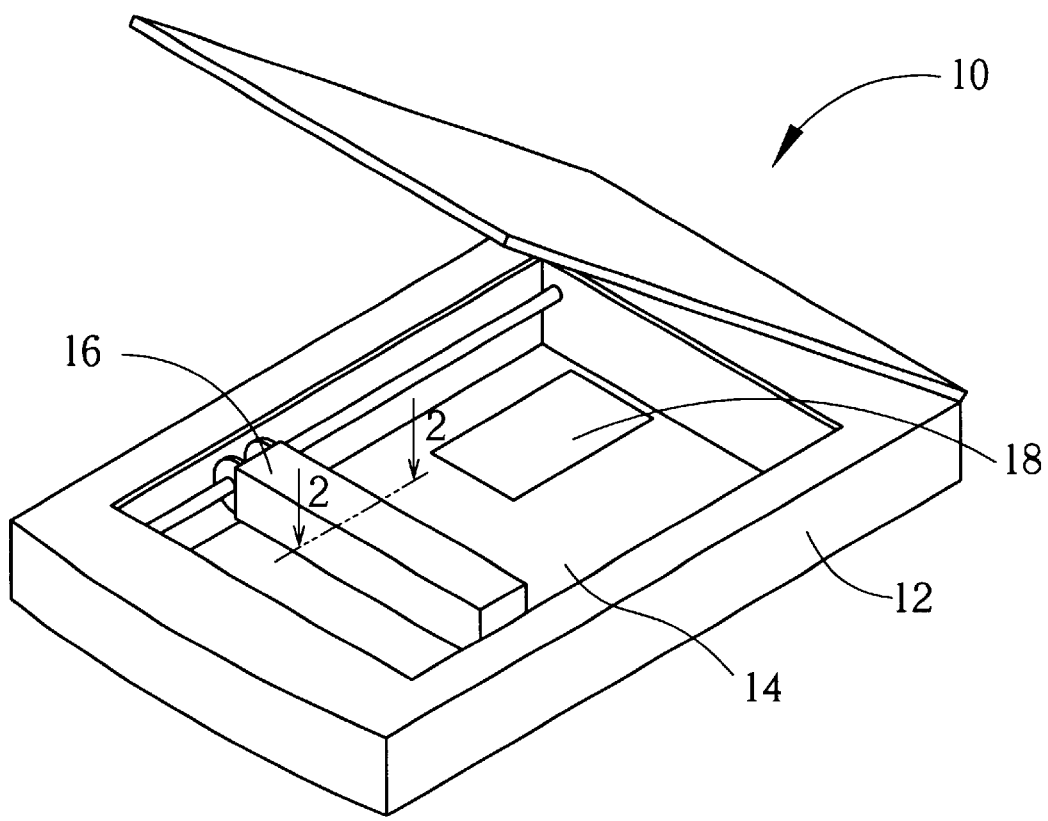
FIG. 1 is a perspective view of a scanner.
Figure 2:
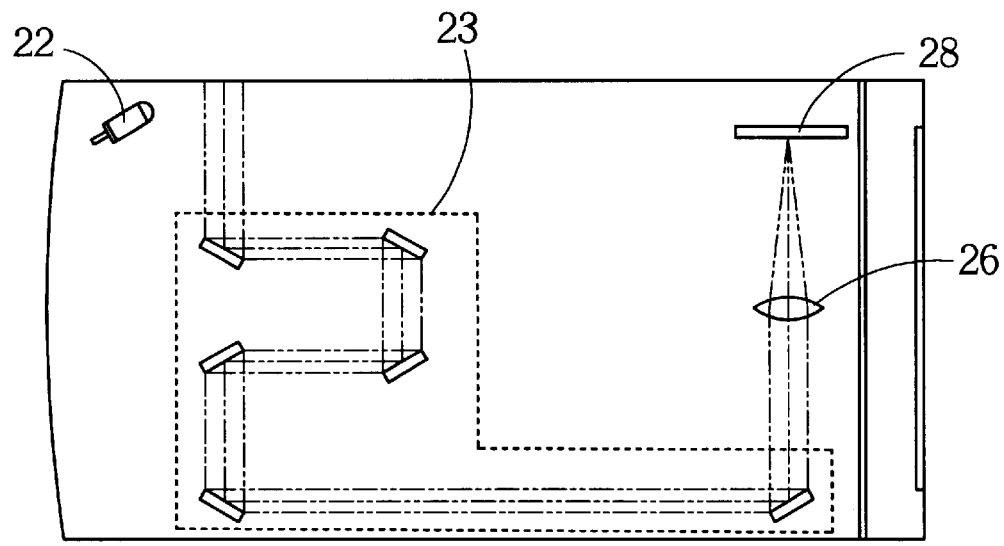
FIG. 2 is a cross-sectional view of the scanning module of a prior art scanner.

Please refer to FIG. 1. FIG. 1 is a perspective view of a scanner 10 according to the present invention. The scanner 10 comprises a housing 12, a transparent platform 14 onto which a document 18 is placed, and a scanning module 16 for scanning the document 18. The operator of the scanner 10 lays the document 18 on the transparent platform 14. The scanning module 16 moves along a track inside the housing 12 and reads the document 18 through the transparent platform 14.

Figure 3:
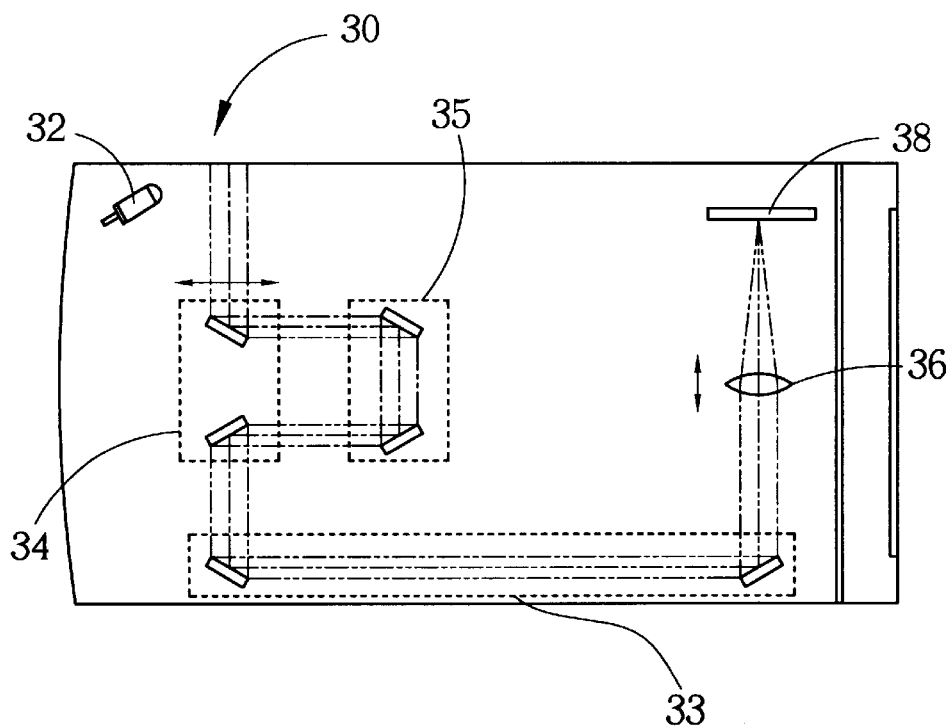
FIGS. 3 and 4 are cross-sectional views of a scanning module according to the first embodiment of the present invention.

FIG. 3 is a cross-sectional view of a scanning module 30 according to the first embodiment of the present invention. The scanning module 30 comprises a light source 32, a fixed first mirror set 33, a moveable second mirror set 34, a fixed third mirror set 35, a moveable lens 36, and a charge coupled device (CCD) 38. As the scanning module 16 moves across the document 18, the light source 32 illuminates the document 18. The image of the illuminated document 18 is reflected by the mirror sets 33, 34, 35. Then the lens 36 focuses the image of the document 18 onto the CCD 38. The first mirror set 33 and the third mirror set 35 are fixed in position. The second mirror set 34 can be retracted in order to move the second mirror set 34 out of the path of light between the document 18 and the first mirror set 33. When the second mirror set 34 is retracted so that it does not interfere with the light from the document 18, only the first mirror set 33 will act to reflect the image of the document 18 onto the lens 36 and the CCD 38. When the second mirror set is engaged, it will intercept the light from the document 18 and in conjunction with the third mirror set 35 it will lengthen the path that the light must travel in order to reach the lens 36 and CCD 38. The third mirror set 35 is involved in the imaging process only when the second mirror set 34 is in position to reflect light from the document 18 to the lens 36 and CCD 38.

As the distance the light travels from the document 18 to the lens 36 changes, the focal distance between the lens 36 and the CCD 38 changes. In order to compensate for this, the lens 36 will move to the proper focal distance between the document 18 and the CCD 38. The position of the lens 36 based on the position of the moveable second mirror set 34. The movement of the second mirror set 34 and the lens 36 will be coordinated by the scanner software, and will be enacted by a mechanical, motorized, or magnetic device. Users will need only to select the resolution at which they wish to scan the document 18 and the software or device driver will adjust the second mirror set 34 and the lens 36 accordingly.

Figure 4:
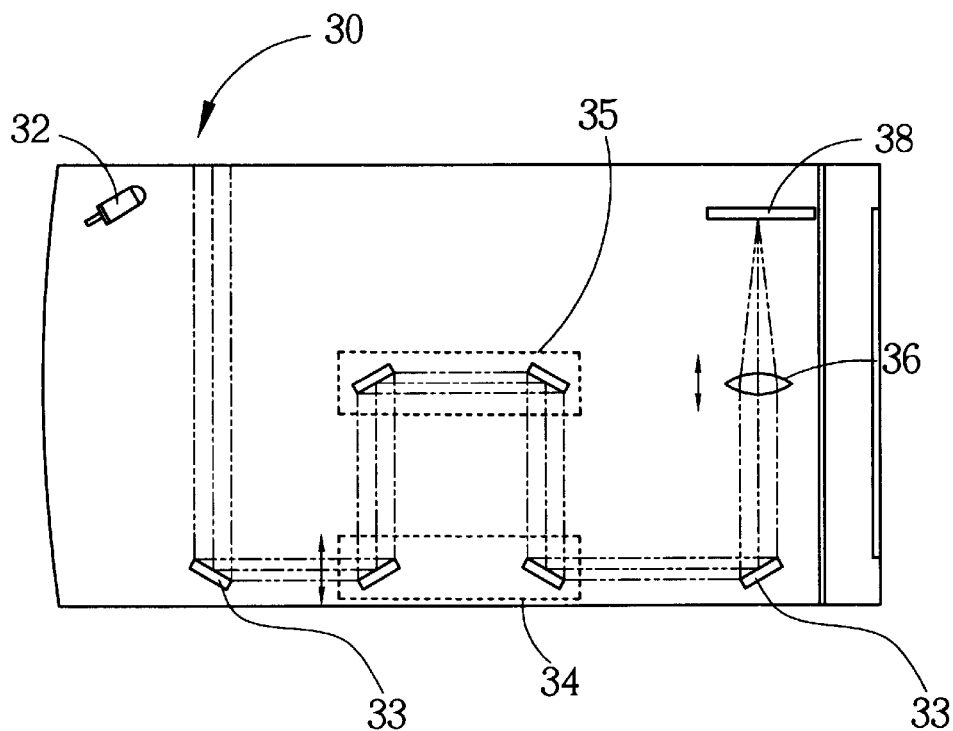

Variations of this embodiment may alter the sequence in which the light strikes the various mirror sets, as demonstrated in FIG. 4. In FIG. 4, even when the moveable second mirror set 34 is in position to intercept light from the document 18, the light first strikes the fixed first mirror set 33.

Figure 5:
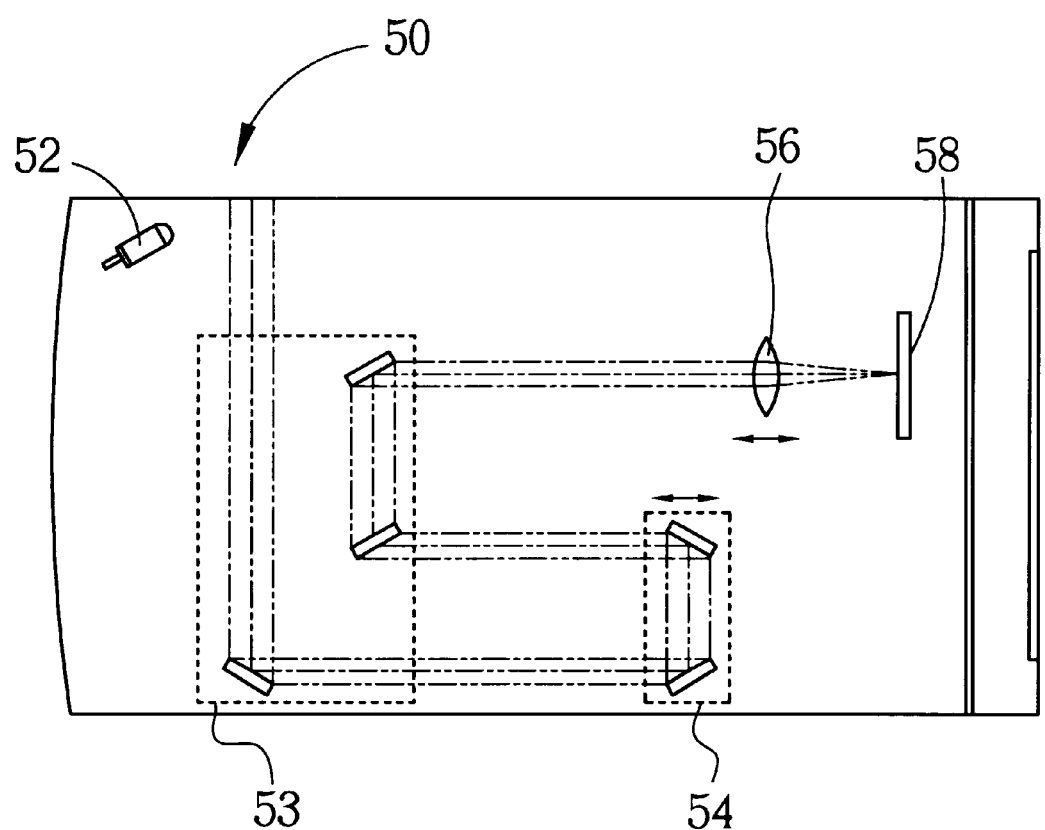
FIG. 5 is a cross-sectional view of a scanning module according to the second embodiment of the present invention.

FIG. 5 is a cross-sectional view of the scanning module 50 of the second embodiment of the present invention. The scanning module 50 comprises a light source 52, a fixed first mirror set 53, a moveable second mirror set 54, a moveable lens 56, and a charge coupled device (CCD) 58. As the scanning module 50 moves across the document 18, the light source 52 illuminates the document 18. The image of the illuminated document 18 is reflected by the mirror sets 53, 54. The lens 56 then focuses the image of the document 18 onto the CCD 58. The first mirror set 53 is fixed in position. The second mirror set 54 may be moved to decrease the distance the light travels from the document 18 to the lens 56, resulting in a higher resolution. A mechanical, motorized, or magnetic device driven by the software or device driver is employed to adjust the position of the lens 56 and the second mirror set 54 to the proper positions for the selected resolution.

Compared to the prior art, the present invention can increase the resolution of a scanned image without the use of extra photosensitive cells in the CCD. The second embodiment of the present invention allows for a large range of resolutions, limited only by the scope of movement of the moveable mirror set. The present invention offers a low-cost alternative for manufacturers of high-quality scanners.

Those skilled in the art will readily observe that numerous modifications and alterations of the scanning module may be made while retaining the teachings of the invention. Accordingly, the above disclosure should be construed as limited only by the metes and bounds of the appended claims.

What is claimed is:

1. A scanner comprising:
    a housing;
    a transparent platform installed on the housing for placing a document;
    a scanning module installed inside the housing for scanning the document, the scanning module comprising:
        a lens moveably installed inside the scanning module for focusing light transmitted through a predetermined optical path from the document to the lens;
        a first mirror set fixed inside the scanning module for forming at least a part of the predetermined optical path;
        a third mirror set fixed inside the scanning module for optionally adjusting a length of the predetermined optical path; and
        a second mirror set moveably installed inside the scanning module, the second mirror set having a first position that causes the predetermined optical path to include the first, second, and third mirror sets and a second position that causes the predetermined optical path to exclude the second and third mirror sets;
        wherein when the second mirror set is moved from the first position to the second position or from the second position to the first position, the lens will move correspondingly to adjust the focus of the light according to the length of the predetermined optical path.

2. The scanner of claim 1 further comprising a light source for generating light toward the document, and a light sensor for receiving the light focused by the lens set.

3. The scanner of claim 2 wherein the light sensor is a charge coupled device (CCD).

4. A method of changing resolution in a scanner, the scanner comprising a light source for illuminating a document placed on the scanner and a lens for focusing light reflected from the document and received through a predetermined optical path by the lens, the scanner further comprising first second, and third mirror pairs, each mirror pair capable of substantially reversing the direction of the predetermined optical path, the method comprising:
    moving the second mirror pair to a first position within the scanner such that the predetermined optical path includes the first, second, and third mirror pairs when a first resolution is selected;
    moving the second mirror pair to a second position within the scanner such that the predetermined optical path includes the first mirror pair and excludes the second and third mirror pairs when a second resolution is selected; and
    moving the lens to adjust the focus of the light according to a changed length of the predetermined optical path when the second mirror pair is moved from the first to the second position or from the second position to the first position.

* * * * *